US010214448B2

(12) United States Patent
Heidel et al.

(10) Patent No.: US 10,214,448 B2
(45) Date of Patent: Feb. 26, 2019

(54) HIGH TEMPERATURE HYDRATOR

(71) Applicant: Carbon Engineering Ltd., Squamish (CA)

(72) Inventors: Kenton Robert Heidel, Calgary (CA); Robert A. Rossi, North Bergen, NJ (US)

(73) Assignee: Carbon Engineering Ltd., Squamish BC (CA)

( * ) Notice: Subject to any disclaimer, the term of this patent is extended or adjusted under 35 U.S.C. 154(b) by 0 days.

(21) Appl. No.: 15/591,324

(22) Filed: May 10, 2017

(65) Prior Publication Data

US 2017/0327421 A1 Nov. 16, 2017

Related U.S. Application Data

(60) Provisional application No. 62/334,225, filed on May 10, 2016.

(51) Int. Cl.
*C04B 2/06* (2006.01)
*C04B 2/04* (2006.01)
(Continued)

(52) U.S. Cl.
CPC .......... *C04B 2/063* (2013.01); *B01D 53/1475* (2013.01); *B01D 53/1493* (2013.01);
(Continued)

(58) Field of Classification Search
CPC .................................................... C04B 2/066
See application file for complete search history.

(56) References Cited

U.S. PATENT DOCUMENTS 3,630,504 A * 12/1971 Reynolds .................. C04B 2/04
422/162
8,865,101 B2 10/2014 Rossi
(Continued)

FOREIGN PATENT DOCUMENTS

CA 2661304 A1 3/2008

OTHER PUBLICATIONS

Rossi, Indirect heat transfer in CPI fluidized beds, Chemical Engineering, Oct. 15, 1984, 8 pages.

*Primary Examiner* — Melvin C. Mayes
*Assistant Examiner* — Michael Forrest
(74) *Attorney, Agent, or Firm* — Fish & Richardson P.C.

(57) ABSTRACT

A method includes transferring at least one feed stream including calcium oxide, calcium carbonate, water, and a fluidizing gas into a fluidized bed; contacting the calcium oxide with the water; based on contacting the calcium oxide with the water, initiating a hydrating reaction; producing, from the hydrating reaction, calcium hydroxide and heat; transferring a portion of the heat of the hydrating reaction to the calcium carbonate; and fluidizing the calcium oxide, calcium hydroxide, and the calcium carbonate into a first fluidization regime and a second fluidization regime. The first fluidization regime includes at least a portion of the calcium carbonate and at least a portion of the calcium oxide, and the second fluidization regime includes at least a portion of the calcium hydroxide and at least another portion of the calcium oxide. The first fluidization regime is different than the second fluidization regime.

17 Claims, 10 Drawing Sheets

(51) Int. Cl.
  *D21C 3/02* (2006.01)
  *C04B 2/08* (2006.01)
  *B01D 53/14* (2006.01)

(52) U.S. Cl.
  CPC .................. *C04B 2/04* (2013.01); *C04B 2/08* (2013.01); *D21C 3/02* (2013.01); *B01D 2252/10* (2013.01)

(56) References Cited

U.S. PATENT DOCUMENTS 9,272,912 B2 3/2016 Rossi
2016/0207778 A1 7/2016 Rossi

* cited by examiner

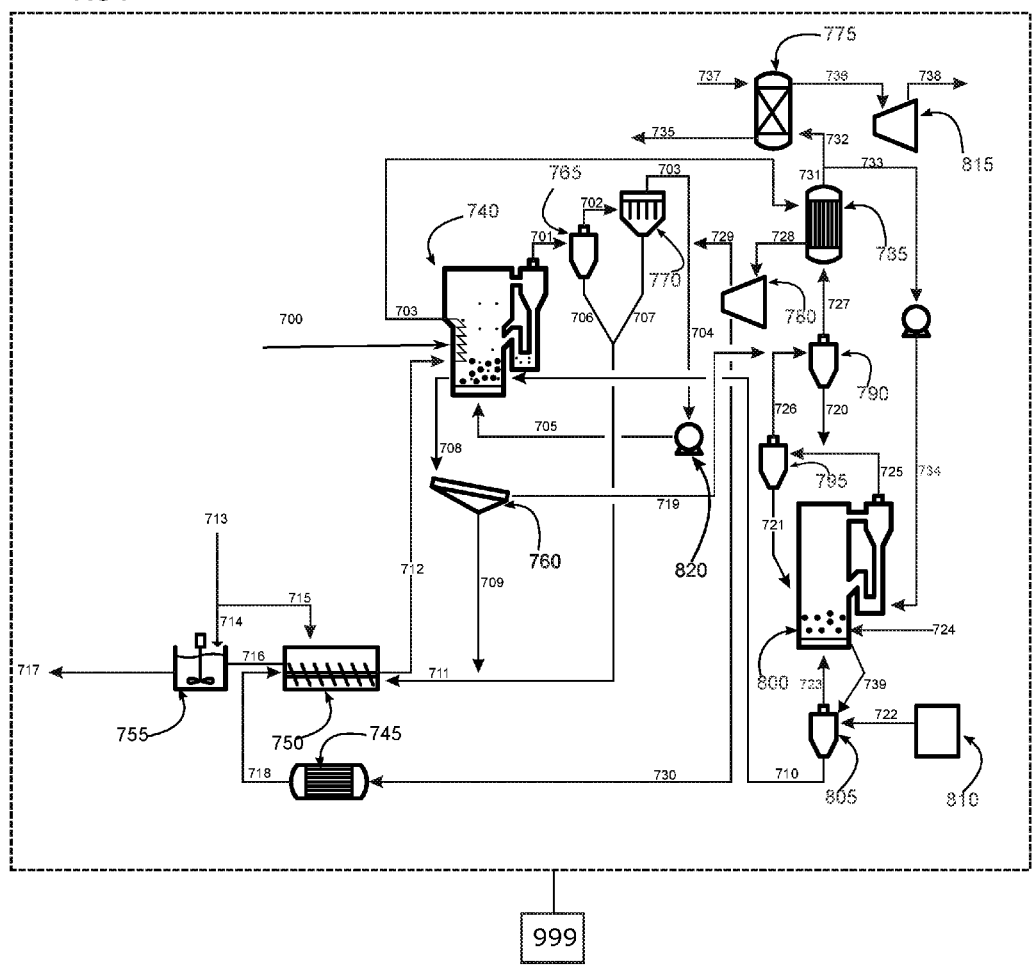

HIGH TEMPERATURE HYDRATOR

CROSS-REFERENCE TO RELATED APPLICATION

This application claims priority under 35 U.S.C. § 119 to U.S. Provisional Patent Application Ser. No. 62/334,225, entitled "High Temperature Hydrator," and filed on May 10, 2016, the entire contents of which are incorporated by reference herein.

TECHNICAL FIELD

This disclosure describes systems, apparatus, and methods for converting calcium oxide to calcium hydroxide.

BACKGROUND

Calcium oxide conversion to calcium hydroxide has been described, in which calcium oxide is reacted with water to produce either a fine, dry powder of calcium hydroxide or a slurry of calcium hydroxide in water. The resulting calcium hydroxide is used in calcium based caustic recovery processes such as the Kraft caustic recovery process employed by the pulp and paper industry.

SUMMARY

In an example implementation, a method includes transferring at least one feed stream including calcium oxide calcium carbonate, water, and a fluidizing gas into a fluidized bed; contacting the calcium oxide with the water; based on contacting the calcium oxide with the water, initiating a hydrating reaction; producing, from the hydrating reaction, calcium hydroxide and heat; transferring a portion of the heat of the hydrating reaction to the calcium carbonate; and fluidizing the calcium oxide, calcium hydroxide, and the calcium carbonate into a first fluidization regime and a second fluidization regime. The first fluidization regime includes at least a portion of the calcium carbonate and at least a portion of the calcium oxide, and the second fluidization regime includes at least a portion of the calcium hydroxide and at least another portion of the calcium oxide. The first fluidization regime being different than the second fluidization regime.

In an aspect combinable with the example implementation, the second fluidization regime includes another portion of the calcium carbonate.

In another aspect combinable with any of the previous aspects, fluidization takes place using at least one fluidization velocity, the at least one fluidization velocity sufficient to cause the at least a portion of one of the calcium carbonate, calcium hydroxide or calcium oxide to separate from the at least a portion of the other calcium carbonate, calcium hydroxide or calcium oxide into the first and second fluidization regime.

In another aspect combinable with any of the previous aspects, the first and second fluidization regimes include a bubbling bed regime and at least one of a transport or turbulent regime.

Another aspect combinable with any of the previous aspects further includes transferring at least a portion of the heat to the calcium carbonate.

Another aspect combinable with any of the previous aspects further includes fluidizing at least a portion of the calcium carbonate in the bubbling bed regime; and fluidizing at least a portion of the calcium hydroxide in the transport or turbulent fluidization regime.

In another aspect combinable with any of the previous aspects, the fluidizing gas includes steam.

Another aspect combinable with any of the previous aspects further includes recirculating a portion of at least one of the calcium oxide or the calcium hydroxide in the transport or turbulent fluid regime back into the fluidized bed; and based on the recirculating, increasing a residence time of at least one of the calcium oxide or calcium hydroxide in the fluidized bed.

Another aspect combinable with any of the previous aspects further includes generating steam from excess heat; and circulating the generated steam to provide heat or power to the at least one of a downstream heat consumer or power producers.

Another aspect combinable with any of the previous aspects further includes providing the water from at least one of a steam feed, a liquid water feed, or water from a wet calcium carbonate feed.

Another aspect combinable with any of the previous aspects further includes recirculating the fluidization gas that exits a fluidized gas outlet of the fluidized bed to a fluidization gas inlet of the fluidized bed.

In another aspect combinable with any of the previous aspects, the method is part of a caustic recovery process.

In another aspect combinable with any of the previous aspects, the caustic recovery process is part of at least one of a direct air capture process, a carbon dioxide capture process, or a pulp and paper process.

In another aspect combinable with any of the previous aspects, at least a portion of one of calcium carbonate, calcium oxide or calcium hydroxide are separated into at least two different fluidization regimes based on one or more of physical properties of the calcium carbonate, calcium oxide, or calcium hydroxide.

In another aspect combinable with any of the previous aspects, the one or more physical properties includes at least one of density, particle size or shape.

Another aspect combinable with any of the previous aspects further includes at least one of heating or drying the calcium carbonate with at least one of a sensible heat of the calcium oxide or the produced heat of the hydrating reaction.

In another aspect combinable with any of the previous aspects, each of the calcium oxide, the calcium carbonate, the water, and the fluidizing gas are transferred into the fluidized bed in a separate feed stream.

In another aspect combinable with any of the previous aspects, the calcium oxide and at least a portion of at least one of the water or the fluidizing gas are transferred into the fluidized bed in a first fluid stream, and the calcium carbonate and at least a portion of at least one of the water or the fluidizing gas are transferred into the fluidized bed in a second fluid stream that is separate from the first fluid stream.

In another example implementation, an apparatus includes a fluidized bed vessel that includes one or more inlet ports arranged to receive at least one feed stream including calcium oxide, calcium carbonate, water, and a fluidizing gas into a volume of the fluidized bed vessel, the fluidized bed vessel including a zone where the calcium oxide contacts the water to initiate a hydrating reaction to produce calcium hydroxide and heat, the fluidized bed vessel configured to operate with a fluidization velocity that fluidizes and separates at least a portion of the calcium carbonate and at least a portion of the calcium oxide into a first fluidization regime, and at least a portion of the calcium hydroxide and at least another portion of the calcium oxide into a second fluidization regime, the first fluidization regime different than the second fluidization regime; a heat transfer assembly thermally coupled to the fluidized bed vessel and configured to transfer a portion of the heat of the hydrating reaction to the calcium carbonate; a cyclone fluidly coupled to the fluidized bed vessel and configured to separate a portion of the fluidization gas from a portion of at least one of the calcium hydroxide, calcium carbonate or calcium oxide; and an outlet port configured to separate the fluidization gas from a portion of at least one of the calcium hydroxide, calcium carbonate or calcium oxide, and to discharge a portion of at least one of the calcium hydroxide, calcium carbonate or calcium oxide.

In an aspect combinable with the example implementation, the fluidized bed vessel is configured to contain a bubbling bed regime and allows for at least one of a circulating turbulent or transport regime.

Another aspect combinable with any of the previous aspects further includes a solids classifier fluidly coupled to the fluidized bed vessel and the outlet port, the solids classifier configured to separate a portion of at least one of the calcium carbonate, calcium hydroxide or calcium oxide from another portion of at least one of the calcium carbonate, calcium hydroxide or calcium oxide.

In another aspect combinable with any of the previous aspects, the heat transfer assembly is configured to transfer a portion of a heat contained in the calcium oxide feed stream to the calcium carbonate.

In another aspect combinable with any of the previous aspects, the bubbling bed regime includes calcium carbonate and at least one of a transport or turbulent regime including calcium hydroxide.

In another aspect combinable with any of the previous aspects, the fluidized bed vessel is configured to operate with a fluidizing gas including steam.

In another aspect combinable with any of the previous aspects, the cyclone further includes a port fluidly coupled to a non-mechanical seal, the non-mechanical seal fluidly coupled to the fluidized bed vessel and configured to recirculate at least a portion of one of calcium carbonate, calcium hydroxide or calcium oxide in the transport or turbulent fluid regime back into the fluidized bed vessel.

In another aspect combinable with any of the previous aspects, the non-mechanical seal includes a loop seal.

In another aspect combinable with any of the previous aspects, the at least one feed stream includes liquid water, the heat transfer assembly configured to transfer heat from the fluidized bed vessel to the liquid water to generate a steam stream.

In another aspect combinable with any of the previous aspects, in the heat exchange assembly includes a heat tubing system thermally coupled to the fluidization bed vessel, the heat tubing system configured to transfer a portion of a heat from the fluidization bed vessel to a fluid stream within the heat tubing system.

In another aspect combinable with any of the previous aspects, the apparatus is thermally and fluidly coupled to a dense fluidized bed heat exchanger.

In another aspect combinable with any of the previous aspects, the cyclone further includes a fluidly coupled port that is configured to enable the fluidization gas to recirculate back to the fluidization gas inlet port.

In another aspect combinable with any of the previous aspects, the solid classifier is configured to separate at least a portion of the calcium carbonate from a portion of at least one of the calcium hydroxide or the calcium oxide based on at least one of particle size or particle density.

In another aspect combinable with any of the previous aspects, the solid classifier is configured to allow the at least one of calcium hydroxide or calcium oxide to return to the fluidized bed vessel.

In another aspect combinable with any of the previous aspects, the solid classifier includes a cone and cap sloped stripper or a sieve.

In another aspect combinable with any of the previous aspects, the apparatus is fluidly coupled to a caustic recovery process.

In another aspect combinable with any of the previous aspects, the caustic recovery process includes a direct air capture process, a carbon dioxide capture process or a pulp and paper process.

In another aspect combinable with any of the previous aspects, the at least one feed stream including calcium oxide, calcium carbonate, water, or a fluidizing gas further includes sensible heat, and the heat transfer assembly is configured to transfer at least a portion of the sensible heat to the calcium carbonate to enable at least one of heating or drying of the calcium carbonate.

In another aspect combinable with any of the previous aspects, each of the calcium oxide, the calcium carbonate, the water, and the fluidizing gas are transferred into the fluidized bed in a separate inlet port.

In another aspect combinable with any of the previous aspects, the calcium oxide and at least one of at least a portion of the water or a portion of the fluidizing gas are transferred into the fluidized bed in a first inlet port, and the calcium carbonate and at least one of at least a portion of the water or a portion of the fluidizing gas are transferred into the fluidized bed in a second inlet port that is separate from the first inlet port.

Implementations according to the present disclosure may include one or more of the following features. For example, this system includes multiple components, for example dryer, hydrators and heat exchange componentry, in a single unit. In some aspects, conventional components for hydrating processes, such as a dryer, hydrator and heat exchange equipment, are replaced by one fluidized bed reactor. The fluidized bed reactor unit has no moving parts, and as such has lower maintenance than systems with separate hydrator, dryer and heat exchanger units, which can require for example transport and/or conveying equipment (with moving parts). The high temperature fluidized bed hydrator unit has higher thermal efficiency than the previously separated equipment, due to having the process streams in direct contact with heat sources (for example, other process streams, fluidizing gases). By using process streams in this manner, the multiple approach temperatures associated with separate heat exchangers can be reduced, for example, from multiple approaches to a single approach. Furthermore, the steam produced within the high temperature hydrator unit can be used in other areas of a plant, for example to provide heat or steam for power generation. This aids in improving overall energy efficiencies of the systems within which a high temperature hydrator may operate.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 7 depicts an illustrative system for converting calcium oxide to calcium hydroxide including a fluidized bed connected with another system.

DETAILED DESCRIPTION

Figure 1:
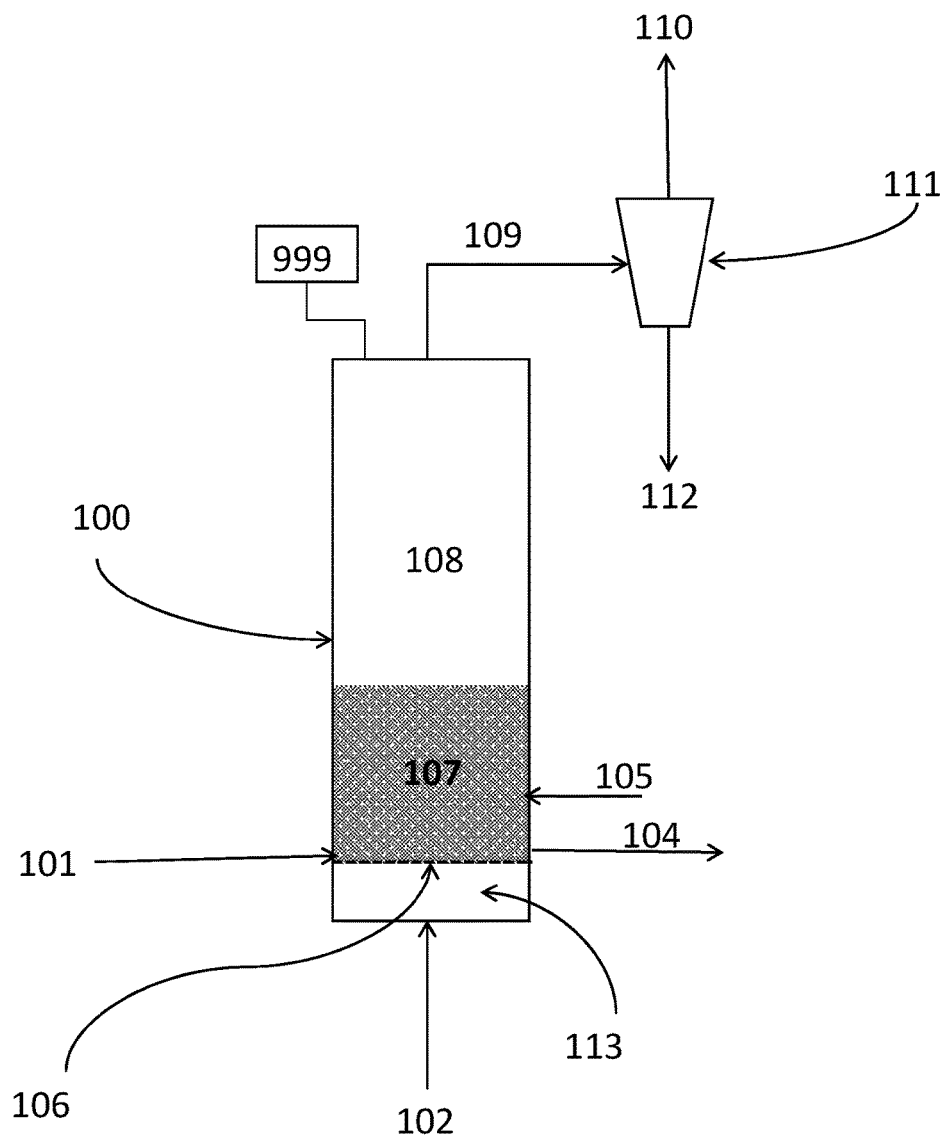
FIG. 1 depicts an illustrative system for converting calcium oxide to calcium hydroxide including a fluidized bed.

The present disclosure describes example implementations of a high temperature hydrator system that may enable two or more solid feedstocks and any resulting solid reaction products to separate into two distinctly different fluidization regimes, based on the different solid physical properties, such as density, particle size distribution and shape. For example, a portion of the feedstocks and a portion of the resulting reaction products, consisting of, for example, more dense particles, larger particles and/or particles of a geometry, which, in the given fluidization environment, favor a bubbling bed regime, while another portion of the feedstocks and reaction products, consisting for example of less dense particles, smaller particles, and/or particles of a geometry, which, in the given fluidization environment, favor a turbulent or transport regime. Regimes of fluidization may result from the fact that fluidized solid beds behave differently as gas properties, velocity, and solid properties are varied. For example, when a solid bed (having a defined set of solid properties) is exposed to an upward flowing fluid, such as a gas (having a defined set of fluid properties), a pressure drop develops across the bed. As the upward flow rate of the fluid increases, there are a range of fluidization regimes that may develop.

One example of a distinct fluidization regime is the bubbling bed regime. A bubbling bed regime is one where the solid material is fluidized above the material's incipient fluidization point but below the point where the material becomes entrained in the gas and capable of leaving the reactor with the gas flow. Another example of a distinct fluidization regime is a turbulent, or transport regime. The turbulent or transport regime is one where the solid material is fluidized to the point where the material becomes entrained in the gas and is transported out of the reactor with the gas. Other examples of distinct fluidization regimes seen in fluidized bed reactors may include homogeneous, dense suspension upflow, slugging, spouted bed, turbulent, fast fluidizing, and pneumatic transport.

In addition to fluidizing the solids, this system provides a desirable environment to allow for the hydrating reaction to occur, whereby incoming calcium oxide mixes with water, in the form of liquid and/or steam, to produce calcium hydroxide. The sensible heat from some of the hot solid feed material, as well as the heat generated from the hydrating reaction itself are used to dry and preheat the other cooler, moist solid materials. Both the hydrating reaction and the heat transfer processes take place in a fluidized bed reactor vessel wherein solid calcium carbonate, solid calcium oxide, steam and liquid water come into contact.

This system includes multiple components, for example dryer, hydrators and heat exchange componentry, in a single unit. In some aspects, conventional components for hydrating processes, such as a dryer, hydrator and heat exchange equipment, are replaced by one fluidized bed reactor. This resulting high temperature fluidized bed hydrator unit has higher thermal efficiency than the previously separated equipment, due to having the process streams in direct contact with heat sources (for example, other process streams, fluidizing gases). By using process streams in this manner, the desired multiple approach temperatures associated with separate heat exchangers are also reduced, for example, from multiple approaches to a single approach. The fluidized bed reactor unit has no moving parts, unlike conventional hydrator and dryer units, and as such, has lower maintenance than such conventional units.

Each of the configurations described later may include process streams (also called "streams") within a system for converting calcium oxide to calcium hydroxide including a fluidized bed. The process streams can be flowed using one or more flow control systems implemented throughout the system. A flow control system can include one or more flow pumps to pump the process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the system for converting calcium oxide to calcium hydroxide, the flow control system can flow the streams under constant flow conditions, for example, constant volumetric rate or other flow conditions. To change the flow conditions, the operator can manually operate the flow control system, for example, by changing the pump flow rate or the valve open or close position.

In some implementations, a flow control system can be operated automatically. For example, the flow control system can be connected to a computer or control system (e.g., control system 999) to operate the flow control system. The control system can include a computer-readable medium storing instructions (such as flow control instructions and other instructions) executable by one or more processors to perform operations (such as flow control operations). An operator can set the flow rates and the valve open or close positions for all flow control systems distributed across the facility using the control system. In such implementations, the operator can manually change the flow conditions by providing inputs through the control system. Also, in such implementations, the control system can automatically (that is, without manual intervention) control one or more of the flow control systems, for example, using feedback systems connected to the control system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the control system. In response to the flow condition exceeding a threshold (such as a threshold pressure value, a threshold temperature value, or other threshold value), the control system can automatically perform operations. For example, if the pressure or temperature in the pipe exceeds the threshold pressure value or the threshold temperature value, respectively, the control system can provide a signal to the pump to decrease a flow rate, a signal to open a valve to relieve the pressure, a signal to shut down process stream flow, or other signals.

Referring to FIG. 1, calcium oxide conversion to calcium hydroxide in the presence of a fluid bed is described with respect to illustrative system 100. In some implementations, system 100 may include feed ports for streams 101, 102 and 105 fluidly coupled to the main system 100, and a discharge port for stream 104 fluidly coupled to the main system 100. In some aspects a gas distribution plate 106 may be fluidly coupled to the main vessel body of system 100. In some aspects system 100 may include a cyclone 111 fluidly coupled to feed ports for stream 109 and discharge ports for streams 112, 110. In some aspects system 100 may include a control system 999 coupled to the components (illustrated or otherwise).

In some implementations, fluidization gases include, for example, air, steam, and the like. As depicted in FIG. 1, gaseous stream 102 including one or more fluidization gases is provided to the hydrator system 100 through the bottom entry zone 113, also known as the plenum chamber, which is below the fluidization distribution plate 106. Gaseous stream 102 may be, for example, air, steam or a combination of these gases and their sub-components. Stream 101 is one of the solid feedstocks, which enters the system above the fluidization distribution plate 106 and becomes fluidized in the bed or bubbling bed regimes within the fluidized bed system 100 and as such it remains in the bubbling bed zone 107, unless discharged as stream 104. Stream 101 may, for example, consist mostly of calcium carbonate or calcium oxide, and may also consist in part of aqueous solutions such as liquid water. Stream 105 is the solid feedstock which becomes fluidized in the turbulent or transport fluidization regime and it also enters the system above the distribution plate 106. Stream 105 may, for example, consist mostly of calcium oxide or calcium carbonate and may also consist in part of liquid or gaseous water. The distribution plate 106 is designed to prevent backflow of any solids into the fluidization gas entry zone 113. Solid material 105, any associated reaction products and any steam generated from liquid water content present in the system are carried out of the bubbling bed 107 and transported through the reactor freeboard zone 108. The resulting mixed stream of fluidization gases and solids is mixed-stream 109, and after leaving the reactor freeboard zone 108, the stream 109 is sent to a cyclone 111, to separate the solids 112, from the gases 110. The fluidization gas 102, is blown into the fluidization gas entry zone 113, of the fluidized bed reactor 100. This fluidizing gas 102, could be partially recycled from the gas stream 110 leaving the cyclone 111.

The hydrating reaction, where calcium oxide is converted to calcium hydroxide, takes place within the fluidized bed reactor system 100:

$CaO(s)+H_2O(l) \rightarrow Ca(OH)_2(s)$ hydrating reaction using liquid water.

$CaO(s)+H_2O(g) \rightarrow Ca(OH)_2(s)$ hydrating reaction using steam.

In some cases the water required for the hydrating reaction can be supplied into system 100 through excess steam brought in with stream 102, or it could also be brought into the system 100 as part of the solids material requiring heating/drying, via stream 101 or 105. In some cases, the stream requiring heat transfer (and that may contain liquid water) could be either stream 101 or 105, depending on the application. For example, in a Kraft caustic recovery system, the calcium carbonate material may be introduced as smaller particles, which may be more comparable to lime mud in particle size, while the calcium oxide material may be introduced as larger particles or clumps, and could have sizes closer to approximately one (1) centimeter in diameter.

In some implementations, a portion of the material normally fluidized within the turbulent/transport regime may leave with the material in the bubbling bed regime. In these implementations, it can be separated based on the difference in physical properties and re-introduced into the reactor system 100 or combined with the finished circulating solids stream 112.

In some implementations, the system 100 could be heat insulated with, for example insulation material. In these cases, care would need to be taken in selecting both the insulation material for heat economy, as well as the vessel material of construction. In some aspects, metal compositions that are capable of maintaining structural integrity under operating pressures and temperatures of around 300° C. would be selected, for example stainless steel or other metal compositions.

In another implementation, system 100 could instead be insulated with refractory lining, allowing for more economical options for vessel material of construction, for example carbon steel.

Figure 2:
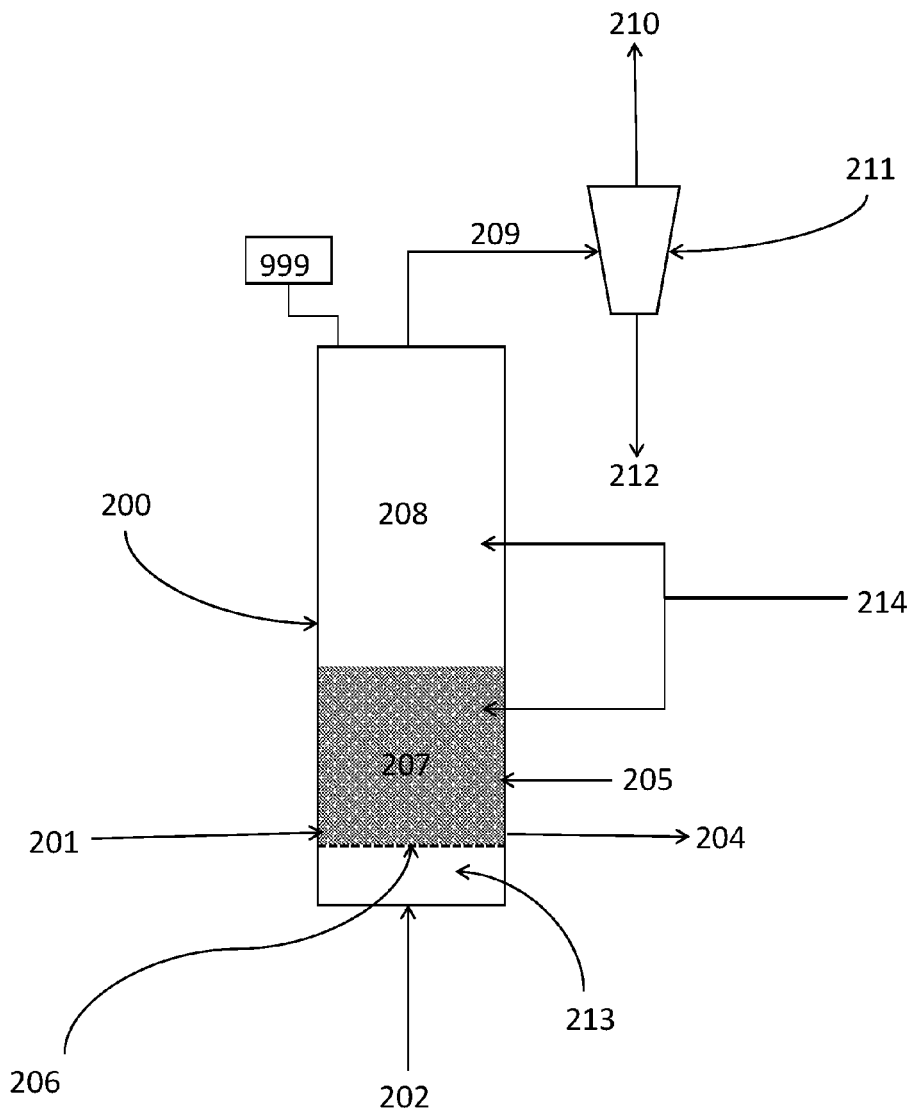
FIG. 2 depicts an illustrative system for converting calcium oxide to calcium hydroxide including a fluidized bed and an optional water injection system.

Referring to FIG. 2, calcium oxide conversion to calcium hydroxide in the presence of a fluid bed is described with respect to illustrative system 200. In some implementations, system 200 may include feed ports for streams 201, 202, 205 and 214 fluidly coupled to the main system 200, and a discharge port for stream 204 fluidly coupled to the main system 200. In some aspects a gas distribution plate 206 may be fluidly coupled to the main vessel body of system 200. In some aspects system 200 may include a cyclone 211 fluidly coupled to feed ports for stream 209 and discharge ports for streams 212, 210. In some aspects system 200 may include a control system 999 coupled to the components (illustrated or otherwise).

In some implementations, fluidization gases include, for example, air, steam, and the like. As depicted in FIG. 2, gaseous stream 202 including one or more fluidization gases is provided to the hydrator system 200 through the bottom entry zone 213, also known as the plenum chamber, which is below the fluidization distribution plate 206. Gaseous stream 202 may be, for example, air, steam or a combination of these gases and their sub-components. Stream 201 is one of the solid feedstocks, which enters the system above the fluidization distribution plate 206 and becomes fluidized in the bed or bubbling bed regimes within the fluidized bed system 200 and as such it remains in the bubbling bed zone 207, unless discharged as stream 204. Stream 201 may, for example, consist mostly of calcium carbonate or calcium oxide, and may also consist in part of aqueous solutions such as liquid water. Stream 205 is the solid feedstock which becomes fluidized in the turbulent or transport fluidization regime and it also enters the system above the distribution plate 206. Stream 205 may, for example, consist mostly of calcium oxide or calcium carbonate and may also consist in part of liquid or gaseous water. The distribution plate 206 is designed to prevent backflow of any solids into the fluidization gas entry zone 213. Solid material 205, any associated reaction products and any steam generated from liquid water content present in the system are carried out of the bubbling bed 207 and transported through the reactor freeboard zone 208. The resulting mixed stream of fluidization gases and solids is mixed-stream 209, and after leaving the reactor freeboard zone 208, the stream 209 is sent to a cyclone 211, to separate the solids 212, from the gases 210. The fluidization gas 202, is blown into the fluidization gas entry zone, 213, of the fluidized bed reactor, 200. This fluidizing gas 202, could be partially recycled from the gas stream 210 leaving the cyclone 211. A portion of the water required for the hydrating reaction can be supplied into system 200 through a variety of feed methods including excess steam brought in with stream 202, as a direct, separate spray of liquid water, 214, which could be fed into either the bubbling bed 207 or freeboard zone 208, or a combination of these methods.

Figure 3A:
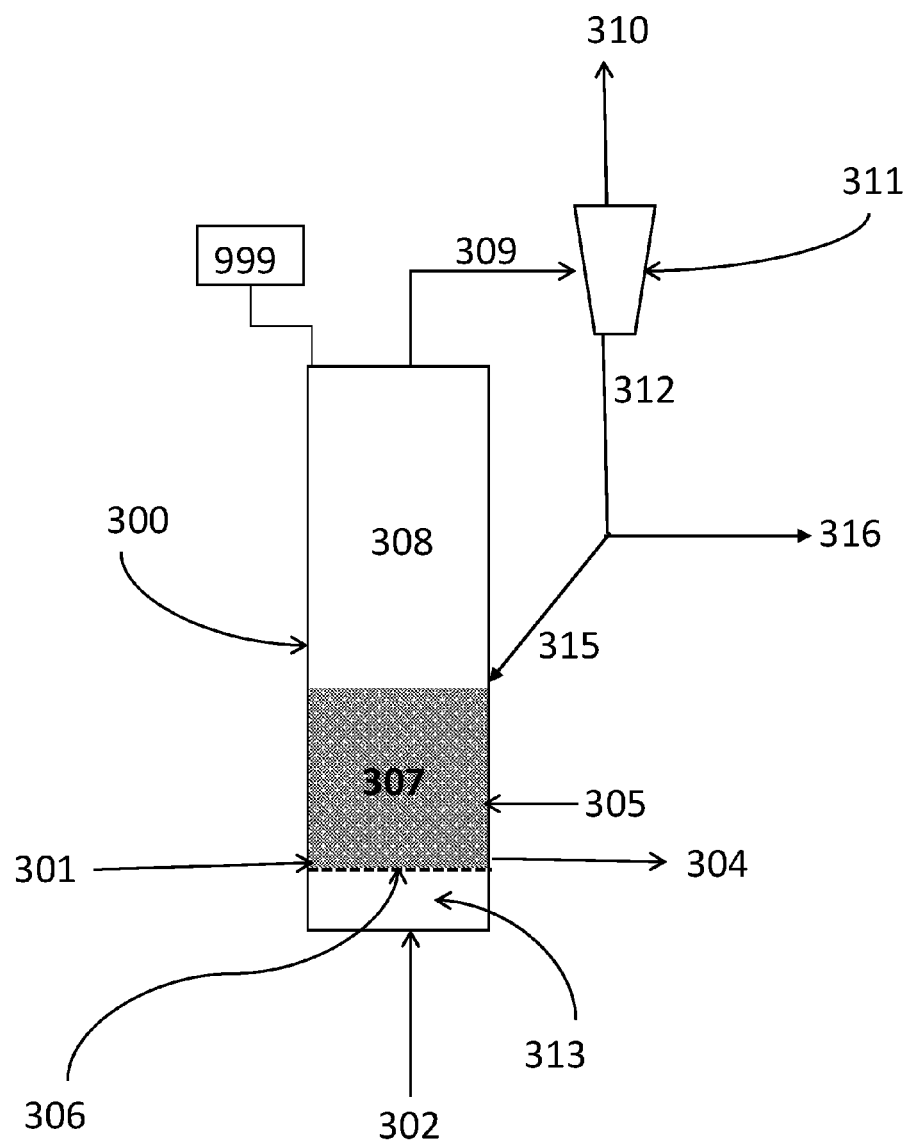
FIG. 3A depicts an illustrative system for converting calcium oxide to calcium hydroxide including a fluidized bed, where circulating material may be recirculated.

Referring to FIG. 3A, calcium oxide conversion to calcium hydroxide in the presence of a fluid bed is described with respect to illustrative system 300. In some implementations, system 300 may include feed ports for streams 301, 302, and 305 fluidly coupled to the main system 300, and a discharge port for stream 304 fluidly coupled to the main system 300. In some aspects a gas distribution plate 306 may be fluidly coupled to the main vessel body of system 300. In some aspects system 300 may include a cyclone 311 fluidly coupled to feed ports for stream 309 and discharge ports for streams 312, 310. In some aspects the cyclone discharge port for stream 312 is fluidly coupled back to the main body of system 300, and may include a non-mechanical valve and feed port on the main body for recirculation of stream 315 back into the main body and a discharge port for stream 316. In some aspects system 300 may include a control system 999 coupled to the components (illustrated or otherwise).

In some implementations, fluidization gases include, for example, air, steam, and the like. As depicted in FIG. 3A, gaseous stream 302 including one or more fluidization gases is provided to the hydrator system 300 through the bottom entry zone 313, also known as the plenum chamber, which is below the fluidization distribution plate 306. Gaseous stream 302 may be, for example, air, steam or a combination of these gases and their sub-components. Stream 301 is one of the solid feedstocks, which enters the system above the fluidization distribution plate 306 and becomes fluidized in the bed or bubbling bed regimes within the fluidized bed system 300 and as such it remains in the bubbling bed zone 307, unless discharged as stream 304. Stream 301 may, for example, consist mostly of calcium carbonate or calcium oxide, and may also consist in part of aqueous solutions such as liquid water. Stream 305 is the solid feedstock which becomes fluidized in the turbulent or transport fluidization regime and it also enters the system above the distribution plate 306. Stream 305 may, for example, consist mostly of calcium oxide or calcium carbonate and may also consist in part of liquid or gaseous water. The distribution plate 306 is designed to prevent backflow of any solids into the fluidization gas entry zone 313. Solid material 305, any associated reaction products and any steam generated from liquid water content present in the system are carried out of the bubbling bed 307 and transported through the reactor freeboard zone 308. The resulting mixed stream of fluidization gases and solids is mixed-stream 309, and after leaving the reactor freeboard zone 308, the stream 309 is sent to a cyclone 311, to separate the solids 312, from the gases 310. The fluidization gas 302, is blown into the fluidization gas entry zone, 313, of the fluidized bed reactor, 300. This fluidizing gas 302, could be partially recycled from the gas stream 310 leaving the cyclone 311. A portion of the solid stream 312 leaving the cyclone 311 is recycled back into system 300 as stream 315. If additional residence time is required for the solids being discharged from the cyclone 311, these solids can be fully or partially re-introduced back into the fluidization vessel of system 300, via stream 315, for example, in a similar fashion to that of a circulating fluidized bed reactor. In some aspects, stream 315 can be re-introduced into the fluidization vessel of system 300 by means of a non-mechanical valve. Some examples of non-mechanical valves are L-valves, J-valves, V-valves, loop seals, seal pots, reverse seals and the like. Stream 316 can be used to withdraw a portion of the circulating solid material from system 300.

Figure 3B:
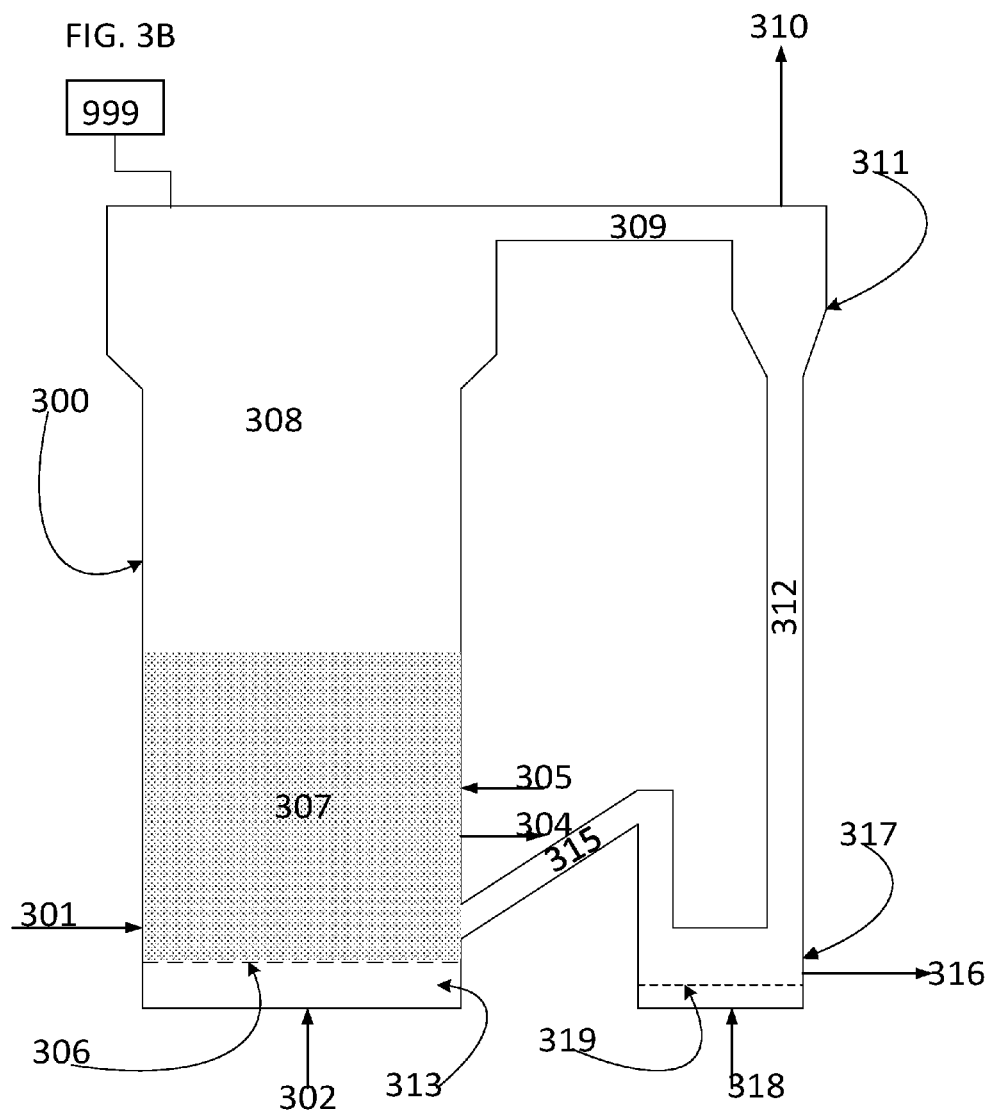
FIG. 3B depicts another illustrative system for converting calcium oxide to calcium hydroxide including a fluidized bed, where circulating material may be recirculated.

Referring to FIG. 3B, calcium oxide conversion to calcium hydroxide in the presence of a fluid bed is described with respect to illustrative system 300. In some implementations, system 300 may include feed ports for streams 301, 302, and 305 fluidly coupled to the main system 300, and a discharge port for stream 304 fluidly coupled to the main system 300. In some aspects a gas distribution plate 306 may be fluidly coupled to the main vessel body of system 300. In some aspects system 300 may include a cyclone 311 fluidly coupled to feed ports for stream 309 and discharge ports for streams 312, 310. In some aspects the cyclone discharge port for stream 312 is fluidly coupled back to the main body of system 300, and may include a non-mechanical valve such as a loop seal 317 fluidly coupled to a feed port on the main body for recirculation of stream 315 back into the main body and a discharge port for stream 316. In some aspects system 300 may include a control system 999 coupled to the components (illustrated or otherwise). In some aspects the loop seal 317 is fluidly coupled to a distribution plate 319 and feed port for stream 318.

In some implementations, fluidization gases include, for example, air, steam, and the like. As depicted in FIG. 3A, gaseous stream 302 including one or more fluidization gases is provided to the hydrator system 300 through the bottom entry zone 313, also known as the plenum chamber, which is below the fluidization distribution plate 306. Gaseous stream 302 may be, for example, air, steam or a combination of these gases and their sub-components. Stream 301 is one of the solid feedstocks, which enters the system above the fluidization distribution plate 306 and becomes fluidized in the bed or bubbling bed regimes within the fluidized bed system 300 and as such it remains in the bubbling bed zone 307, unless discharged as stream 304. Stream 301 may, for example, consist mostly of calcium carbonate or calcium oxide, and may also consist in part of aqueous solutions such as liquid water. Stream 305 is the solid feedstock which becomes fluidized in the turbulent or transport fluidization regime and it also enters the system above the distribution plate 306. Stream 305 may, for example, consist mostly of calcium oxide or calcium carbonate and may also consist in part of liquid or gaseous water. The distribution plate 306 is designed to prevent backflow of any solids into the fluidization gas entry zone 313. Solid material 305, any associated reaction products and any steam generated from liquid water content present in the system are carried out of the bubbling bed 307 and transported through the reactor freeboard zone 308. The resulting mixed stream of fluidization gases and solids is mixed-stream 309, and after leaving the reactor freeboard zone 308, the stream 309 is sent to a cyclone 311, to separate the solids 312, from the gases 310. The fluidization gas 302, is blown into the fluidization gas entry zone, 313, of the fluidized bed reactor 300. This fluidizing gas 302, could be partially recycled from the gas stream 310 leaving the cyclone 311.

A portion of the solid stream 312 leaving the cyclone 311 is recycled back into system 300 as stream 315. If additional residence time is required for the solids being discharged from the cyclone 311, these solids can be fully or partially re-introduced back into the fluidization vessel of system 300, via stream 315, for example, in a similar fashion to that of a circulating fluidized bed reactor. In some aspects, stream 315 can be re-introduced into the fluidization vessel of system 300 by means of a non-mechanical valve.

Some examples of non-mechanical valves are L-valves, J-valves, V-valves, loop seals, seal pots, reverse seals and the like. Stream 316 can be used to withdraw a portion of the circulating solid material from system 300. All components in the system 300 are substantially the same as in the embodiment of the system 300 illustrated in FIG. 3A, with the exception being that more detail is shown on how the system 300 could be built to accommodate the recirculation of solid stream 312. In this implementation, solid stream 312 is shown moving down a vertical length of pipe that connects the cyclone 311 back to the main vessel body of system 300. In some example aspects, this pipe may include a non-mechanical valve, such as a loop seal 317 complete with a gas stream 318 being fed through a distribution plate 319. In some aspects the distribution plate 319 may instead be nozzles. In some aspects the gas stream 318 may for example include air, steam or the like. Stream 318 provides sufficient backpressure through the loop seal 317 so that fluidizing gases from the main vessel system 300 do not divert backwards through the loop seal 317.

Figure 4A:
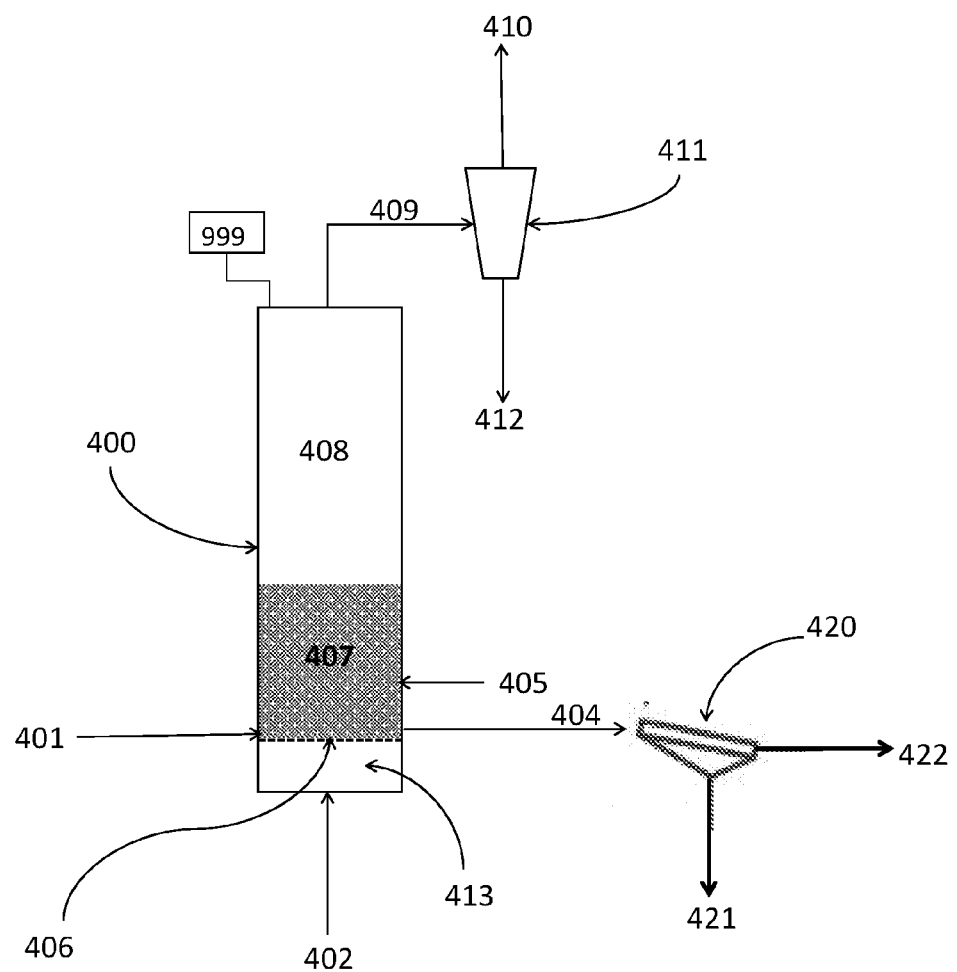
FIG. 4A depicts an illustrative system for converting calcium oxide to calcium hydroxide including a fluidized bed, where material discharged from the bed is further processed.

Referring to FIG. 4A, calcium oxide conversion to calcium hydroxide in the presence of a fluid bed is described with respect to illustrative system 400. In some implementations, system 400 may include feed ports for streams 401, 402, and 405 fluidly coupled to the main system 400, and a discharge port for stream 404 fluidly coupled to the main system 400. In some aspects the discharge port 404 is fluidly coupled to a solids classifier unit, for example an external sieve unit 420. The external sieve unit 420 is fluidly coupled to discharge ports for streams 422 and 421. In some aspects a gas distribution plate 406 may be fluidly coupled to the main vessel body of system 400. In some aspects system 400 may include a cyclone 411 fluidly coupled to feed ports for stream 409 and discharge ports for streams 412, 410. In some aspects system 400 may include a control system 999 coupled to the components (illustrated or otherwise).

In some implementations, fluidization gases include, for example, air, steam, and the like. As depicted in FIG. 4A, gaseous stream 402 including one or more fluidization gases is provided to the hydrator system 400 through the bottom entry zone 413, also known as the plenum chamber, which is below the fluidization distribution plate 406. Gaseous stream 402 may be, for example, air, steam or a combination of these gases and their sub-components. Stream 401 is one of the solid feedstocks, which enters the system above the fluidization distribution plate 406 and becomes fluidized in the bed or bubbling bed regimes within the fluidized bed system 400 and as such it remains in the bubbling bed zone 407, unless discharged as stream 404. Stream 401 may, for example, consist mostly of calcium carbonate or calcium oxide, and may also consist in part of aqueous solutions such as liquid water. Stream 405 is the solid feedstock which becomes fluidized in the turbulent or transport fluidization regime and it also enters the system above the distribution plate 406. Stream 405 may, for example, consist mostly of calcium oxide or calcium carbonate and may also consist in part of liquid or gaseous water. The distribution plate 406 is designed to prevent backflow of any solids into the fluidization gas entry zone 413. Solid material 405, any associated reaction products and any steam generated from liquid water content present in the system are carried out of the bubbling bed 407 and transported through the reactor freeboard zone 408. The resulting mixed stream of fluidization gases and solids is mixed-stream 409, and after leaving the reactor freeboard zone 408, the stream 409 is sent to a cyclone 411, to separate the solids 412, from the gases 410. The fluidization gas 402, is blown into the fluidization gas entry zone 413, of the fluidized bed reactor 400. This fluidizing gas 402, could be partially recycled from the gas stream 410 leaving the cyclone 411. An external sieve unit 420 is used to segregate material withdrawn from the bubbling bed zone 407 based on physical properties, for example particle size. A portion of the material normally fluidized within the turbulent/transport regime may leave with the material in the bubbling bed regime in stream 404.

In this implementation, the turbulent or transport regime material can be separated from the bubbling regime material based on the difference in physical properties, using sieve unit 420 such that the smaller material drops through the sieve 420 and leaves as stream 421, and the larger material remains above the sieve holes and leaves as stream 422. Stream 421 can be re-introduced into the reactor system 400 for further reaction, or combined with the finished circulating solids stream 412 and sent to downstream processing, for example to cooling and/or lime slurry systems that can be used in carbon dioxide capture facilities such as industrial (point source) facilities and facilities that capture more dilute carbon dioxide sources such as direct air capture facilities, as well as waste water treatment facilities or Kraft caustic recover processes. Stream 422 could also be sent to downstream processing, for example to heat exchangers and fluid bed calciner systems sometimes used in direct air capture facilities.

In some aspects, stream 421 may include for example calcium oxide and calcium hydroxide particles, and stream 422 may include for example calcium carbonate pellets.

Figure 4B:
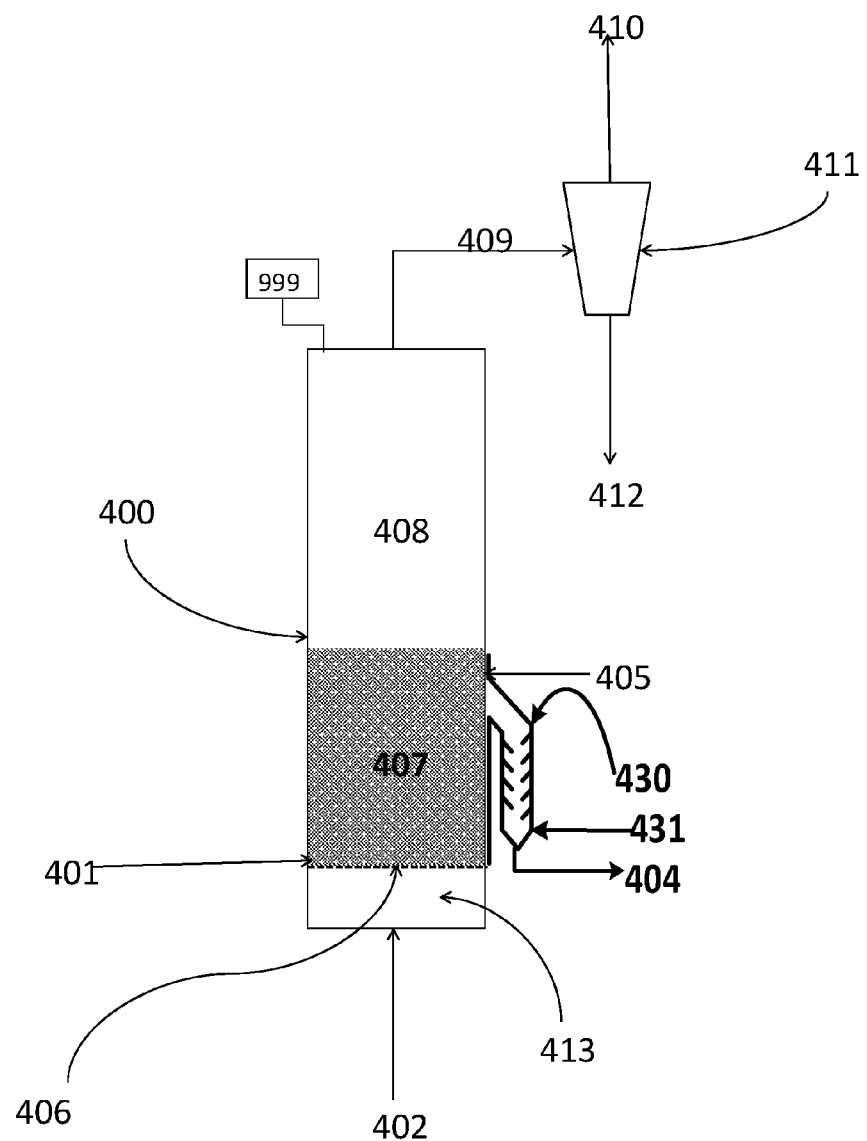
FIG. 4B depicts an illustrative system for converting calcium oxide to calcium hydroxide including a fluidized bed, where material may be separated before being discharged.

Referring to FIG. 4B, calcium oxide conversion to calcium hydroxide in the presence of a fluid bed is described with respect to illustrative system 400. In some implementations, system 400 may include feed ports for streams 401, 402, and 405 fluidly coupled to the main system 400, and a discharge port for stream 404 fluidly coupled to the main system 400. In some aspects the discharge port 404 is fluidly coupled to an internal solids classifier unit 430, which is internal to system 100. In some aspects, the internal solids classifier unit 430 can be a cone and cap sloped stripper. In some aspects the internal solids classifier unit 430 is fluidly coupled to a feed port for stream 431 and a discharge port for stream 404. In some aspects a gas distribution plate 406 may be fluidly coupled to the main vessel body of system 400. In some aspects system 400 may include a cyclone 411 fluidly coupled to feed ports for stream 409 and discharge ports for streams 412, 410. In some aspects system 400 may include a control system 999 coupled to the components (illustrated or otherwise).

In some implementations, fluidization gases include, for example, air, steam, and the like. As depicted in FIG. 4B, gaseous stream 402 including one or more fluidization gases is provided to the hydrator system 400 through the bottom entry zone 413, also known as the plenum chamber, which is below the fluidization distribution plate 406. Gaseous stream 402 may be, for example, air, steam or a combination of these gases and their sub-components. Stream 401 is one of the solid feedstocks, which enters the system above the fluidization distribution plate 406 and becomes fluidized in the bed or bubbling bed regimes within the fluidized bed system 400 and as such it remains in the bubbling bed zone 407, unless discharged as stream 404. Stream 401 may, for example, consist mostly of calcium carbonate or calcium oxide, and may also consist in part of aqueous solutions such as liquid water. Stream 405 is the solid feedstock which becomes fluidized in the turbulent or transport fluidization regime and it also enters the system above the distribution plate 406. Stream 405 may, for example, consist mostly of calcium oxide or calcium carbonate and may also consist in part of liquid or gaseous water. The distribution plate 406 is designed to prevent backflow of any solids into the fluidization gas entry zone 413. Solid material 405, any associated reaction products and any steam generated from liquid water content present in the system are carried out of the bubbling bed 407 and transported through the reactor freeboard zone 408. The resulting mixed stream of fluidization gases and solids is mixed-stream 409, and after leaving the reactor freeboard zone 408, the stream 409 is sent to a cyclone 411, to separate the solids 412, from the gases 410. The fluidization gas 402, is blown into the fluidization gas entry zone 413, of the fluidized bed reactor, 400. This fluidizing gas 402, could be partially recycled from the gas stream 410 leaving the cyclone 411. Componentry internal to system 400 is used to segregate material withdrawn from the bubbling bed zone 407 based on physical properties, for example particle size and/or density.

In this implementation, material is segregated based on physical properties such as size, and/or mass, through use of a baffled channel or annulus solids classifier component 430. Material from the bubbling bed zone 407 enters this component 430, and the baffles and upward flowing gases from stream 431 prevent smaller or lighter particles from making it to the bottom discharge section and instead act to push the smaller and/or lighter material back into the main vessel body of system 400. The larger or heavier material moves down through component 430 to the bottom discharge portion where it can then be discharged as stream 404. In some aspects, stream 431 includes gases such as air or steam and the like. In some aspects, component 430 may for example be a cone and cap sloped stripper. In other aspects, component 430 could be similar to the mechanisms of discharging spent catalyst material from gas-solid fluidized beds, such as those found in fluidized beds used for catalytic cracking of hydrocarbons. In catalytic cracking fluidized beds, the spent catalyst solids are discharged, for example, from a fluidized bubbling (non-circulating) bed via a baffled annulus such that larger catalyst moves downward and out into a discharge channel, and finer material and gases move upward back into fluidization vessel.

Figure 5A:
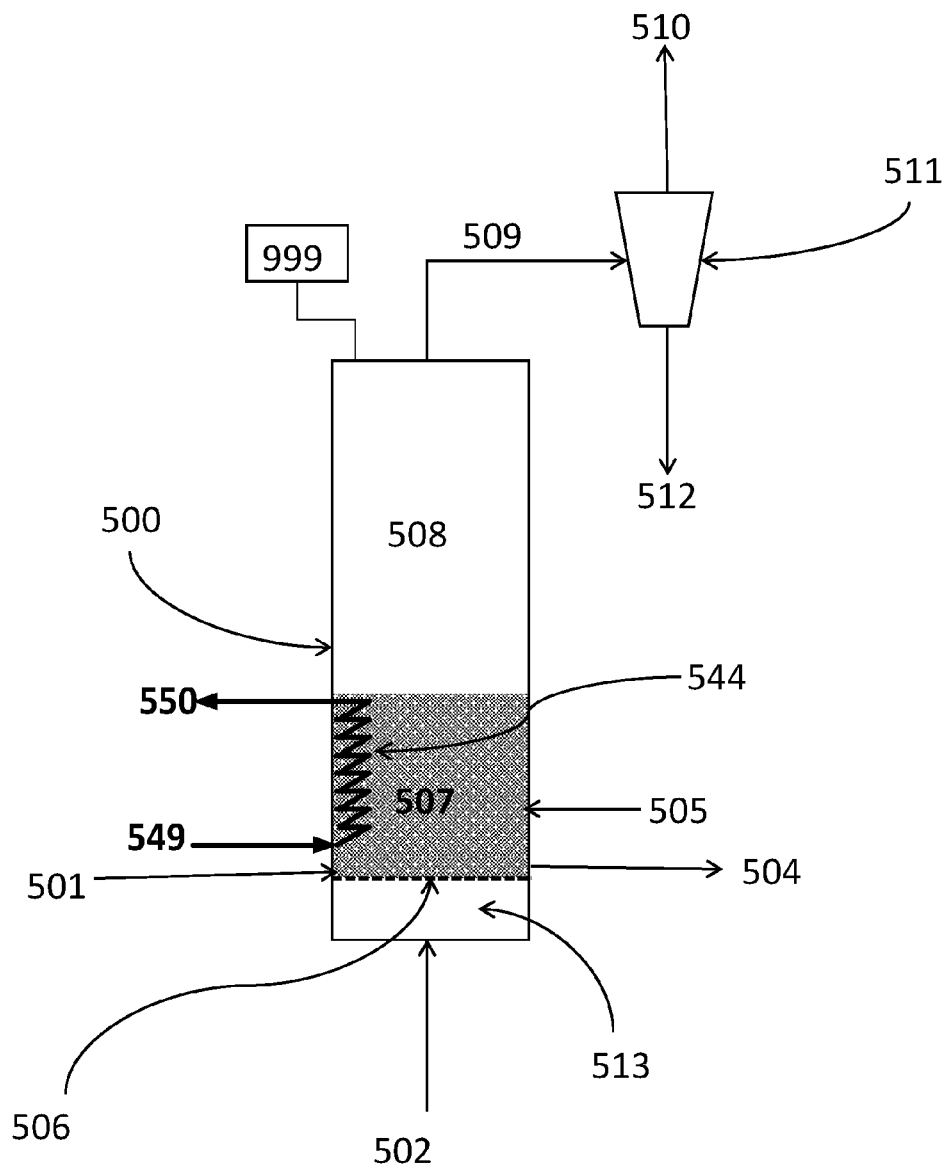
FIG. 5A depicts an illustrative system for converting calcium oxide to calcium hydroxide including a fluidized bed and a system for indirectly transferring heat.

Referring to FIG. 5A, calcium oxide conversion to calcium hydroxide in the presence of a fluid bed is described with respect to illustrative system 500. In some implementations, system 500 may include feed ports for streams 501, 502, and 505 and fluidly coupled to the main system 500, and a discharge port for stream 504 fluidly coupled to the main system 500. In some aspects a gas distribution plate 506 may be fluidly coupled to the main vessel body of system 500. In some aspects system 500 may include a cyclone 511 fluidly coupled to feed ports for stream 509 and discharge ports for streams 512, 510. In some aspects system 500 may include heat tubing componentry 544 fluidly coupled to system 500, including a feed port for stream 549 and a discharge port for stream 550 fluidly coupled to the heat tubing componentry 544. In some aspects system 500 may include a control system 999 coupled to the components (illustrated or otherwise).

In some implementations, fluidization gases include, for example, air, steam, and the like. As depicted in FIG. 5A, gaseous stream 502 including one or more fluidization gases is provided to the hydrator system 500 through the bottom entry zone 513, also known as the plenum chamber, which is below the fluidization distribution plate 506. Gaseous stream 502 may be, for example, air, steam or a combination of these gases and their sub-components. Stream 501 is one of the solid feedstocks, which enters the system above the fluidization distribution plate 506 and becomes fluidized in the bed or bubbling bed regimes within the fluidized bed system 500 and as such it remains in the bubbling bed zone 507, unless discharged as stream 504. Stream 501 may, for example, consist mostly of calcium carbonate or calcium oxide, and may also consist in part of aqueous solutions such as liquid water. Stream 505 is the solid feedstock which becomes fluidized in the turbulent or transport fluidization regime and it also enters the system above the distribution plate 506. Stream 505 may, for example, consist mostly of calcium oxide or calcium carbonate and may also consist in part of liquid or gaseous water. The distribution plate 506 is designed to prevent backflow of any solids into the fluidization gas entry zone 513. Solid material 505, any associated reaction products and any steam generated from liquid water content present in the system are carried out of the bubbling bed 507 and transported through the reactor freeboard zone 508. The resulting mixed stream of fluidization gases and solids is mixed-stream 509, and after leaving the reactor freeboard zone 508, the stream 509 is sent to a cyclone 511, to separate the solids 512, from the gases 510. The fluidization gas 502, is blown into the fluidization gas entry zone 513, of the fluidized bed reactor 500. This fluidizing gas 502, could be partially recycled from the gas stream 510 leaving the cyclone 511. heating tube componentry 544, has been added to the vessel walls of system 500 in the bubbling bed zone 507.

In this implementation, any portions of either the sensible heat or heat from the hydrating reaction, which is not consumed to heat the pellets and supply the enthalpy to bring the pellets to the operating temperature of the fluid bed, is used instead to make saturated steam for subsequent superheat and power generation. In this implementation, The high temperature hydrator system 500 is built with heat tubing componentry 544 which lines the inner wall of the unit, within the bubbling bed zone 507. During operation of system 500, a stream 549 which could be for example, boiler feed water another appropriate heat exchange fluid, or another process fluid stream, is fed into the tube componentry 544, where the heat from the fluidized bed zone 507 moves through the tubes and into the contents of stream 549 as they move through the tubes. In some aspects, stream 549 is boiler feed water and this indirect heating converts the boiler feed water into saturated steam that leaves the tube componentry as stream 550. In some aspects, the saturated steam from these tubes is sent as stream 550 to downstream heat consumers or power producers, for example other process heat exchangers or a steam superheater unit and/or steam turbine.

Figure 5B:
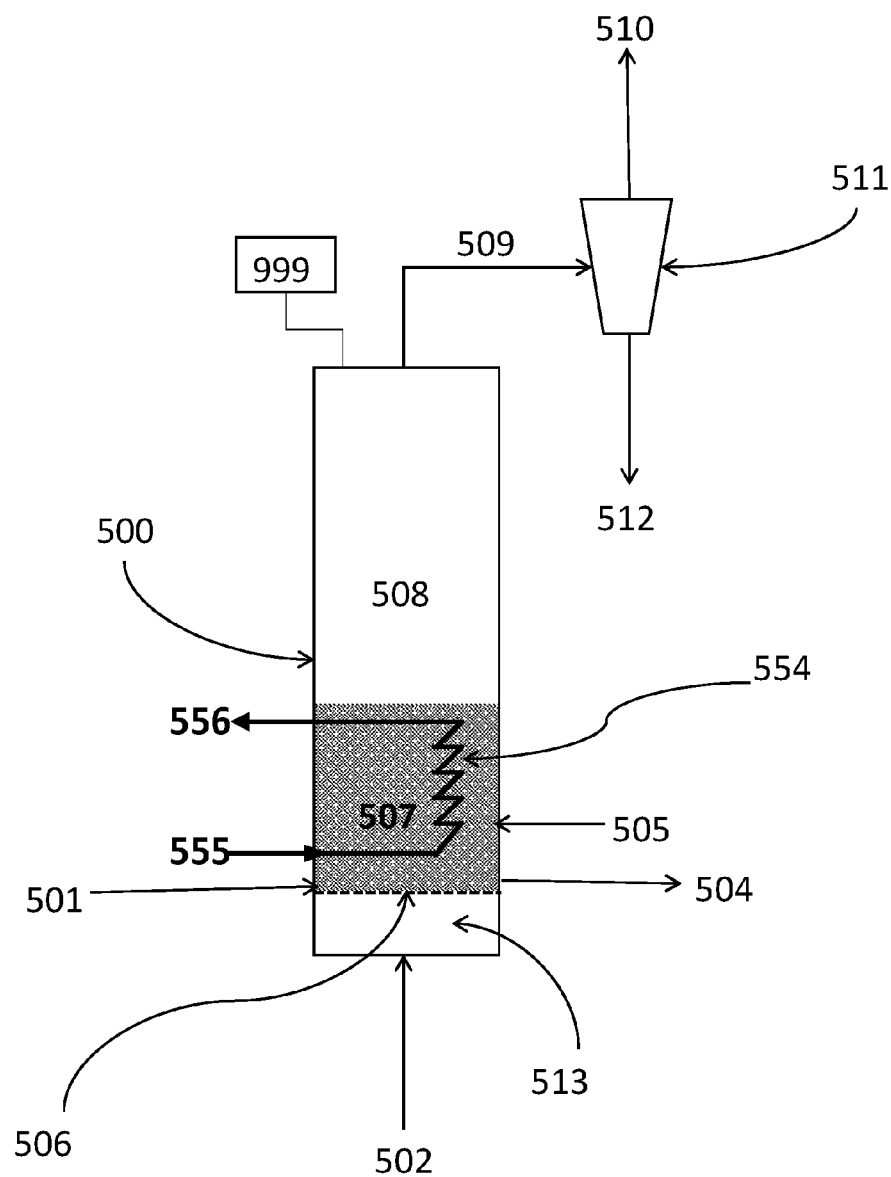
FIG. 5B depicts an illustrative system for converting calcium oxide to calcium hydroxide including a fluidized bed and a system for indirectly transferring heat.

Referring to FIG. 5B, calcium oxide conversion to calcium hydroxide in the presence of a fluid bed is described with respect to illustrative system 500. In some implementations, system 500 may include feed ports for streams 501, 502, and 505 and fluidly coupled to the main system 500, and a discharge port for stream 504 fluidly coupled to the main system 500. In some aspects a gas distribution plate 506 may be fluidly coupled to the main vessel body of system 500. In some aspects system 500 may include a cyclone 511 fluidly coupled to feed ports for stream 509 and discharge ports for streams 512, 510. In some aspects system 500 may include heat tubing componentry 554 fluidly coupled to system 500, including a feed port for stream 555 and a discharge port for stream 556 fluidly coupled to the heat tubing componentry 554. In some aspects system 500 may include a control system 999 coupled to the components (illustrated or otherwise).

In some implementations, fluidization gases include, for example, air, steam, and the like. As depicted in FIG. 5B, gaseous stream 502 including one or more fluidization gases is provided to the hydrator system 500 through the bottom entry zone 513, also known as the plenum chamber, which is below the fluidization distribution plate 506. Gaseous stream 502 may be, for example, air, steam or a combination of these gases and their sub-components. Stream 501 is one of the solid feedstocks, which enters the system above the fluidization distribution plate 506 and becomes fluidized in the bed or bubbling bed regimes within the fluidized bed system 500 and as such it remains in the bubbling bed zone 507, unless discharged as stream 504. Stream 501 may, for example, consist mostly of calcium carbonate or calcium oxide, and may also consist in part of aqueous solutions such as liquid water. Stream 505 is the solid feedstock which becomes fluidized in the turbulent or transport fluidization regime and it also enters the system above the distribution plate 506. Stream 505 may, for example, consist mostly of calcium oxide or calcium carbonate and may also consist in part of liquid or gaseous water. The distribution plate 506 is designed to prevent backflow of any solids into the fluidization gas entry zone 513. Solid material 505, any associated reaction products and any steam generated from liquid water content present in the system are carried out of the bubbling bed 507 and transported through the reactor freeboard zone 508. The resulting mixed stream of fluidization gases and solids is mixed-stream 509, and after leaving the reactor freeboard zone 508, the stream 509 is sent to a cyclone 511, to separate the solids 512, from the gases 510. The fluidization gas 502, is blown into the fluidization gas entry zone 513, of the fluidized bed reactor 500. This fluidizing gas 502, could be partially recycled from the gas stream 510 leaving the cyclone 511. The heat tube componentry 554 is positioned away from the vessel wall of system 500, and instead is protruding across a substantial portion of the cross section of the bubbling bed zone 507. In this implementation, any portions of either the sensible heat or heat from the hydrating reaction, which is not consumed to heat the pellets and supply the enthalpy to bring the pellets to the operating temperature of the fluid bed, is used instead to make saturated steam for subsequent superheat and power generation. In this implementation, The high temperature hydrator system 500 is built with heat tubing componentry 554 which protrudes across a substantial portion of the cross section of the bubbling bed zone 507. During operation of system 500, a stream 555 which could be for example, boiler feed water another appropriate heat exchange fluid, or another process fluid stream, is fed into the tube componentry 554, where the heat from the fluidized bed zone 507 moves through the tubes and into the contents of stream 555 as they move through the tubes. In some aspects, stream 555 is boiler feed water and this indirect heating converts the boiler feed water into saturated steam that leaves the tube componentry as stream 556. In some aspects, the saturated steam from these tubes is sent as stream 556 to downstream heat consumers or power producers, for example other process heat exchangers or a steam superheater unit and/or steam turbine.

Figure 6:
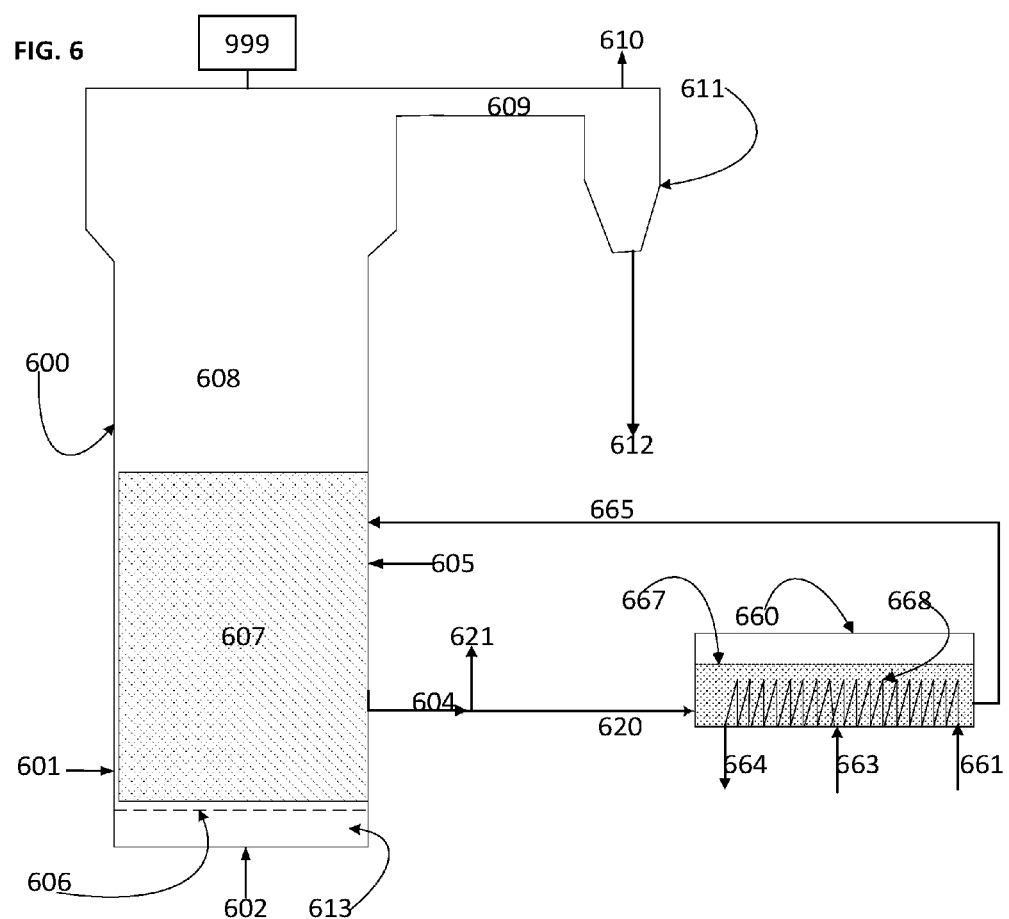
FIG. 6 depicts an illustrative system for converting calcium oxide to calcium hydroxide including a fluidized bed and a system for indirectly transferring heat.

Referring to FIG. 6, calcium oxide conversion to calcium hydroxide in the presence of a fluid bed is described with respect to illustrative system 600. In some implementations, system 600 may include feed ports for streams 601, 602, and 605 and fluidly coupled to the main system 600, and a discharge port for stream 604 fluidly coupled to the main system 600. In some aspects a gas distribution plate 606 may be fluidly coupled to the main vessel body of system 600. In some aspects system 600 may include a cyclone 611 fluidly coupled to feed ports for stream 609 and discharge ports for streams 612, 610. In some aspects system 600 may be fluidly coupled to an external fluidized bed system 660, including discharge ports fluidly coupled to the external fluidized bed system 660 for streams 621, 665 and feed ports for stream 620 and 663. In some aspects system 600 may be fluidly coupled to a feed port for stream 665. In some aspects, the external fluidized bed system 660 may be fluidly coupled to heat tubing componentry 668 and system 660 and heat tubing componentry 668 may also be fluidly coupled to a feed port for stream 661 and a discharge port for stream 664. In some aspects system 600 may include a control system 999 coupled to the components (illustrated or otherwise).

In some implementations, fluidization gases include, for example, air, steam, and the like. As depicted in FIG. 6, gaseous stream 602 including one or more fluidization gases is provided to the hydrator system 600 through the bottom entry zone 613, also known as the plenum chamber, which is below the fluidization distribution plate 606. Gaseous stream 602 may be, for example, air, steam or a combination of these gases and their sub-components. Stream 601 is one of the solid feedstocks, which enters the system above the fluidization distribution plate 606 and becomes fluidized in the bed or bubbling bed regimes within the fluidized bed system 600 and as such it remains in the bubbling bed zone 607, unless discharged as stream 604. Stream 201 may, for example, consist mostly of calcium carbonate or calcium oxide, and may also consist in part of aqueous solutions such as liquid water. Stream 605 is the solid feedstock which becomes fluidized in the turbulent or transport fluidization regime and it also enters the system above the distribution plate 606. Stream 605 may, for example, consist mostly of calcium oxide or calcium carbonate and may also consist in part of liquid or gaseous water. The distribution plate 606 is designed to prevent backflow of any solids into the fluidization gas entry zone 613. Solid material 605, any associated reaction products and any steam generated from liquid water content present in the system are carried out of the bubbling bed 607 and transported through the reactor freeboard zone 608. The resulting mixed stream of fluidization gases and solids is mixed-stream 609, and after leaving the reactor freeboard zone 608, the stream 609 is sent to a cyclone 611, to separate the solids 612, from the gases 610. The fluidization gas 602, is blown into the fluidization gas entry zone 613, of the fluidized bed reactor 600. This fluidizing gas 602, could be partially recycled from the gas stream 610 leaving the cyclone 611. An indirectly heated external fluidized bed system 660 is connected to system 600 such that material from the bubbling bed 607 can be discharged to the external fluidized bed system 660 and after being processed in 660, the material can be sent back to system 600. The separate fluidized bed vessel 660 may include componentry such as heat tubing 668, heat exchange medium entering the heat tubing 668 as stream 661 and leaving as stream 664, a densely fluidized bed 667, and a fluidization gas stream 663.

In some implementations, system 660 is operated under significantly higher density bed conditions so that heat tubing 668 can be densely packed within the vessel 660 and come in close contact with the fluidized pellet bed 667.

In some implementations, the pellets from the bubbling bed zone 607 of the main high temperature hydrator vessel 600 may be moved back and forth between vessel 660 and vessel 600 in order to exchange heat from vessel 600 to vessel 660 and its componentry, for example the heat tubing system 668.

In some implementations, steam generation may be split between the high temperature hydrator system 600 and the external dense fluidized bed vessel 660. In this implementation, a portion of the discharged stream 604 would feed into system 660 as stream 620. Both boiler feed water heating and steam generation could occur within the tubing 668, and the resultant cooled pellet material is transferred back to system 600 via stream 665. In some aspects, the heat exchange occurring within system 660 is such that stream 665 is cooled to below 300° C. and is recycled to the bubbling bed zone 607. In some aspects, sending the cooler stream 665 back to system 600 allows for control of temperature within system 600.

In some aspects, there is another portion of stream 604 that does not feed into system 660, but instead leaves as stream 621. This stream 621 could be sent to downstream processing, for example to a fluidized calciner unit as part of a direct air capture system.

In some implementations, system 600 might be configured such that it produces a low bed-side heat transfer film coefficient. This, combined with heat transfer surface mechanical limitations, for example, a low heat tube surface area to bed surface area ratio, might not allow for full heat extraction from the bubbling bed zone 607 in system 600.

In some aspects heat coils are used inside system 600, where the heat coils are as illustrated in FIGS. 5A and 5B. In some of these cases, the fluid in the streams feeding the heat coils is boiler feed water and the temperature of the boiler feed water, may not provide enough of a differential temperature drive to overcome the above mentioned mechanical surface area limitations (that result in a low approach temperature requirement). In these cases, the use of an external densely fluidized bed system such as 660 as illustrated in FIG. 6, would utilize a lower fluidization velocity (resulting in a denser bubbling bed, for example) in comparison to the bubbling bed in system 600, and as such should have both a higher surface area ratio and bed-side coefficient to overcome the low boiler feed water approach temperature requirements.

FIG. 7 illustrates how a high temperature hydrator may, for example, be connected to other processes such as a direct air capture process. In some implementations, the direct air capture (DAC) process is configured to capture dilute concentrations of carbon dioxide from the atmosphere and produce a concentrated liquid or gaseous stream of carbon dioxide which can be utilized in applications such as Enhanced Oil Recovery (EOR), as feedstock for the production of synthetic hydrocarbons. In some cases, the concentrated liquid or gaseous carbon dioxide can instead be sequestered in a subsurface saline aquifer, reservoirs or aging oil fields as part of the previously mentioned EOR process. In some cases, the concentrated liquid or gaseous stream of carbon dioxide may instead be combined with other chemical feedstock, for example hydrogen, and further processed into a synthetic hydrocarbon such as diesel, gasoline and waxes.

In some implementations, the DAC process operates as a continuous, closed-loop system that inputs water, energy and small material make-up streams, and delivers highly concentrated, pressurized carbon dioxide.

Some examples of major process equipment involved in an implementation of this type of direct air capture commercial process include air contactors, fluidized bed reactive crystallizers also known as pellet reactors, oxy-fired circulating fluidized bed calciners, and some types of lime slakers or hydrators. Auxiliary equipment also involved in this type of direct air capture process may include, for example, compressors, turbines, boilers, heat exchangers, steam systems and oxygen production units such as Air Separation Units (ASU) or a variety of water electrolyzer units.

In some implementations, the DAC process draws air through an air contactor, where it contacts a strong aqueous hydroxide solution, such as potassium hydroxide (KOH). The carbon dioxide in the air reacts with the potassium hydroxide to form a solution of potassium carbonate ($K_2CO_3$) and water, absorbing about three-quarters of the available carbon dioxide.

In some implementations, the DAC process potassium carbonate solution is transferred to a fluidize bed reactive crystallizer or pellet reactor. In some aspects the fluidized bed reactive crystallizer or pellet reactor is a liquid-solid fluidized bed, where the potassium carbonate solution can contact calcium hydroxide ($Ca(OH)_2$), also known as hydrated lime, and precipitate calcium carbonate pellets through a process known as causticization.

In some implementations, the DAC process calcium carbonate pellets from the fluidized bed reactive crystallizer pass through a slaker to absorb heat before being fed into a circulating fluidized bed calciner, which is essentially a type of high-temperature kiln or furnace. The heat releases the carbon dioxide as a highly concentrated, gaseous stream, leaving calcium oxide (CaO) as by-product, through a process known as calcination. In some aspects, heat for the calciner is provided by combusting natural gas with oxygen (known as "oxy-firing"), so that the combustion exhaust may contain mostly carbon dioxide with some water, and can be combined with the carbon dioxide stream leaving the calciner. In some aspects the oxygen used for oxy-firing is separated from air using an air separator.

In some implementations of the DAC process, the calcium oxide is fed into the slaker, where it may combine with steam to regenerate hydrated lime, which can then be fed into the fluidized bed reactive crystallizer or pellet reactor for reuse. In some aspects, the slaker may be configured as a high temperature hydrator.

In some implementations, at least a portion of the electrical power for the DAC process derives from on-site generation. In some aspects, the on-site power generation uses natural gas as fuel, or from external, grid-supplied renewable electricity sources. In some aspects, some of the DAC process electrical power is generated on-site using waste or excess steam, for example from the calciner or high temperature hydrator.

FIG. 7 does not show all the major equipment involved in a direct air capture process, rather, it illustrates one embodiment of how the key interfaces, for example heat and material stream exchanges, could be set up between a high temperature hydrator system and the immediate upstream and downstream process and heat exchange equipment of a direct air capture process. In the implementation illustrated in FIG. 7, calcium carbonate pellets, which may have been processed upstream to remove process solution, are fed, slightly wet, via stream 700 to the high temperature hydrator unit 740. In some aspects the direct air capture process may include a control system 999 coupled to the components (illustrated or otherwise).

The wet calcium carbonate pellets in stream 700, and hot calcium oxide (quicklime) in stream 710 that originated from the calciner system 800, are both fed into the high temperature hydrator unit 740 and mixed. The high temperature hydrator 740 is fluidized by recirculating steam, as stream 705. In some aspects, a portion of the steam stream 705 takes part in the slaking reaction that converts the feed stream of calcium oxide material in stream 710 into calcium hydroxide material.

The calcium carbonate pellets in stream 700 that are fed into the high temperature hydrator unit 740 do not participate in the slaking reaction; instead, they are dried and heated using the process heat within the high temperature hydrator unit 740. The calcium oxide in stream 710 is delivered at a temperature of approximately 694° C. The calcium oxide stream 710 may include, for example, approximately 94.5% reactive calcium oxide, 3.4% unreactive calcium oxide, and 2.1% impurities.

A stream of mostly preheated and dried pellets are drawn out of the bubbling bed zone of the high temperature hydrator unit 740 and sent as stream 708 to the solid sieve unit 760 to separate the solids into a stream of larger pellets, stream 719, and any smaller particles, such as calcium oxide and calcium hydroxide, as stream 709. The larger solids in stream 719 can be fed to the calciner preheat cyclone system 790 at an approximate temperature of 300° C.

The calcium hydroxide solid particles can be separated from the calcium carbonate pellets due to a substantial size difference between the small, micron sized calcium hydroxide particles and the larger, millimeter sized calcium carbonate pellets. The calcium hydroxide will therefore pass through the solid sieve unit 760, which may for example have a mesh with 0.8 mm diameter holes, while the pellets, being larger, will not pass through the holes in the mesh and will instead move along the top of the mesh and out a separate exit. Any unreacted calcium oxide present in the feed stream to the solid sieve unit 760 will, depending on size, either recycle back to the calciner unit 800 with stream 719 or continue onto the cooler unit 750 in stream 711, where it has another opportunity to react with water, in a hydration reaction, to form calcium hydroxide.

After passing through the high temperature hydrator unit 740, the steam stream 701 may be further cleaned of solids using for example a cyclone unit 765 and a baghouse unit 770, then recirculated back to the inlet gas distributor, or "windbox," of the high temperature hydrator unit 740 using a high temperature blower 820.

Any solid material that passes the primary cyclone of the high temperature hydrator unit 740 will be fine particles that may be captured further downstream by a cyclone unit 765, leaving this unit as stream 706 or even further downstream in a baghouse unit 770, leaving this unit as stream 707.

In some implementations, a portion of the calcium carbonate pellets may be small enough to transport along with the circulating material and as such, wind up in any one or a combination of streams 706, 707, and 709. Depending on the amount of calcium carbonate pellet material present in these streams, this may introduce a form of dead load propagating forward into downstream processes within the system. This dead load can be mitigated by including, for example, one or more hot sieve screens to process at least a portion of one or both of streams 706 and 707 to capture the calcium carbonate material and direct it over to the calciner system 800.

In some implementations, all three streams 706, 707, and 709, could be combined into stream 711 and sent to a cooler unit 750, where they are cooled using water from streams 715 and 718. In some aspects, cooling unit 750 is built with a cooled screw, where stream 718 is boiler feed water from a steam condenser unit 745 that flows through an internal cavity in the screw, allowing for indirect cooling of the contents of the cooling unit 750. This screw may mix stream 711 with a water stream 715. In some aspects, stream 711 may include for example unreacted calcium oxide, which as a result of mixing in cooling unit 750 with stream 715, could react via the hydrating reaction to produce calcium hydroxide. In some aspects, unit 750 also allows some heat from stream 711 and some heat resulting from any hydrating reaction to transfer indirectly to the boiler feed water stream 718, providing a further preheated stream 712 of boiler feed water that can then be sent to the high temperature hydrator unit 740 for conversion into saturated steam stream 703.

In some implementations, the cooler unit 750 carries out two functions: a) it cools exiting stream 716 to below 100° C. so that it can be safely mixed with water in mixing tank 755 to form the required $Ca(OH)_2$ slurry and b) it provides for a small amount of water (stream 715) to be sprayed onto the solid $Ca(OH)_2$ to complete the remaining slaking reaction.

In some implementations, after leaving the cooler unit 750, the $Ca(OH)_2$ stream 716 is sent to the mixing tank 755, where it is formed into a slurry mix using a water source (stream 714). This slurry mix could be, for example, diluted with water to a slurry having a consistency of between 20 wt % to 40 wt % solids. In some aspects, the water source may be for example potable, non-potable, process water knocked out from on-site compressor units, recovered from washing systems or other process units.

In some implementations, the cooled $Ca(OH)_2$ that is now retained within unit 755 can be sent further downstream to other processes that require the use of hydrated lime in either solid $Ca(OH)_2$ form or a wetter slurry form. Examples of some types of downstream processes that may be fed from stream 717 include the pellet reactor units found within some types of carbon dioxide capture processes such as direct air capture, water treatment facilities, and caustic recovery units within the Kraft pulp and paper process.

In some implementations, the heat generated in the high temperature hydrator 740 may not be fully consumed in the process of drying and preheating the pellets. The excess heat could be used to generate steam, which could then be use for example for other process heat requirements or for power production via stream 703, which in the implementation shown in FIG. 7, feeds into a steam superheater unit 785. In other aspects, the excess heat from the high temperature hydrator 740 could be removed from unit 740 by means of direct exchange with internal fluids within unit 740 that then leave the unit and are fed through downstream heat exchangers (not shown). In other aspects, the excess heat from the high temperature hydrator unit 740 could be removed by means of indirect exchange with heating tubes or coils located either within the vessel walls of 740 as shown in FIG. 7, or for example by heat tubes or coils located further into the bubbling bed zone of unit 740 as illustrated in FIG. 5B, or via a separate external fluidizing vessel as illustrated in FIG. 6.

In some aspects, the oxy-fired calciner 800 is a circulating fluidized bed, which is fluidized with a flow of pure oxygen shown in the process flow diagram of FIG. 7 as stream 723.

The calciner 800 is used to decompose the calcium carbonate ($CaCO_3$) pellets from stream 719 into calcium oxide (CaO) and carbon dioxide at a temperature of approximately 900° C. High temperature is required to drive the endothermic calcination reaction to the desired 98% conversion of calcium carbonate to calcium oxide.

The hot pellets from the high temperature hydrator 740 are sent to the calcination system via stream 719 by way of two consecutive cyclone preheat stages (790 followed by 795) to raise the temperature of the pellets further before entering the calciner unit 800 via stream 721.

Hot gas from the calciner unit 800 output stream 725 (primarily carbon dioxide), is fed to preheating cyclone stage 795 at approximately 900° C., and then via stream 726 to preheat cyclone stage 790 at approximately 650° C. The gas stream 727 is then extracted from the calciner unit 800 and may be sent through coolers such as unit 785 before being sent to clean-up units such as 775 and compression unit 815.

The gas leaving the calciner 800 in stream 727 contains all the carbon dioxide from the calcination of the pellets. In some implementations where for example natural gas combustion is used as the heat to drive the endothermic calcination reaction, stream 727 would also contain the carbon dioxide from the combustion of natural gas. In some aspects, the composition of this gas stream 727 is 82.8 wt % $CO_2$, 14.6 wt % $H_2O$, 1.13 wt % $O_2$, and 1.43 wt % $N_2$.

In some aspects, a small amount of the calciner 800 off-gas (primarily carbon dioxide) is re-circulated back into the system through stream 734 after passing the last cooling unit 785, but before the water vapor has been removed. This stream can be used as a supply for various minor fluid bed requirements such as instrument purges, and to aid the circulation of the solids from the primary cyclone 795 back into the main calciner bed. This can be done with air but recycled carbon dioxide is used in this implementation instead to prevent dilution of the calciner off-gases with nitrogen.

The stream 739 of remaining hot solid reaction product leaving calciner unit 800—which includes for example mostly quicklime or calcium oxide (CaO)—may be used to preheat the incoming oxygen feed stream 722 via a heat exchange unit 805 before being sent to downstream cooling and/or processing units. This solid calcium oxide product from the calcination reaction is shown as stream 739 in FIG. 7. In some implementations, the very hot material in stream 739 may be close-coupled to the high temperature hydrator unit 740 to avoid an expensive transport device. This may also require, for example, a grade level high temperature hydrator pellet screen with a vertical 300° C. pellet pneumatic transport to carry the pellet feed (stream 719) to the calciner pre-heat cyclone 790. In some aspects it is desirable to minimize, for example, capital expense and operational difficulties of this configuration; in this case, a portion of the supplemental (in addition to feed pellet water) reactive steam (stream 729), could be diverted as a slipstream and used for the pneumatic transport of stream 719 to the pre-heat cyclone 790, before being returned to the recirculation stream 704 (not shown).

In some aspects, unit 805 could be a bubbling fluidized bed. In some aspects where unit 805 is a bubbling fluidized bed, the hot calcium oxide in stream 739 from the calciner unit 800 is fluidized by the oxygen stream 722, which could transfer heat directly from the calcium oxide stream 739 to the oxygen stream 722. This could raise the temperature of the oxygen stream 722 from ambient to approximately 700° C. in stream 723. In some aspects this bubbling fluid bed 805 may be refractory lined, suitable for service with high temperature oxygen, and completely gas-tight to prevent release of oxygen from the system.

In some aspects, the heat for the calciner unit 800 is supplied by combustion of natural gas fed from stream 724.

The heat for the calcination endothermic reaction could be provided from a variety of sources, depending on the economics and resources associated with the location of a particular commercial plant. In an example aspect, the heat source is electric. In another example aspect, the heat source is combustion of a hydrocarbon such as natural gas. In another example aspect, the heat source is solar or solar thermal. In another example aspect, the heat source is combustion of biomass. In yet another example aspect the heat source is combustion of hydrogen.

Oxygen for the calciner unit 800 is provided via stream 722. In some aspects, the oxygen stream 722 is supplied by an air separation unit (ASU) which may for example operate at a pressure of approximately 20 $kPa_g$. In other aspects the oxygen source for stream 722 may be a by-product of water electrolysis.

In some implementations, the high temperature hydrator unit 740 may be built as a refractory lined circulating fluidized bed, or CFB. In some aspects, the fluidization velocity in the high temperature hydrator is chosen such that the calcium carbonate pellets remain as a fluidized bed in the bottom of the device while smaller calcium oxide particles recirculate through the primary cyclone and loop seal that are shown as being integral to unit 740 in FIG. 7 and which are called out in more detail in FIG. 3B. As the calcium oxide particles are transported around the high temperature hydrator 740, they may react with the steam and slake to form $Ca(OH)_2$ and, as a result of this reaction, heat may be released. The sensible heat of the circulating calcium oxide material, fluidization gases, and the heat from the hydrating reaction contribute to heating the calcium carbonate pellets in the bubbling bed zone up to 300° C. The heated and dried pellets (708) are drawn out of the bubbling zone of the high temperature hydrator unit 740 and sent to downstream processes. Any fine material which passes the primary cyclone of the high temperature hydrator unit 740 may be, for example, $Ca(OH)_2$ and could be captured by the cyclone (765) and/or baghouse (770) units. These units may be used If the downstream high temperature fluidization fan (820) is not able to withstand the small amount of solids in the recirculating steam stream 704. All three streams of hydrated lime (706, 707, 709) may be combined as stream 711 and sent to another unit in the process, for example a cooling unit 750 as illustrated in FIG. 7.

In one aspect, heat generated in the high temperature hydrator unit 740 shown in FIG. 7 may not be fully consumed in drying and preheating the calcium carbonate pellets; in this case, the excess or waste heat could be used to generate steam for other heat or power requirements. One example of how this could be done is illustrated in FIG. 7, where superheated steam stream 703 is produced indirectly by flowing boiler feedwater as part of stream 712 through a set of heating coils imbedded in the high temperature hydrator unit 740. This steam leaves the high temperature hydrator 740 as stream 703, is sent to a steam superheater unit 785 where it is further heated and then used to feed a steam turbine 780.

In another implementation, the high temperature hydrator unit 740 as illustrated in FIG. 7 may be operated such that the fluidization velocity within this unit 740 is set as high as possible while keeping the calcium carbonate pellets in a bubbling fluidized bed mode. In an example aspect, this fluidization velocity is set to 0.75 m/s. At This velocity, the calcium oxide will be elutriated out of the bed, captured by the primary cyclone and re-introduced back into the bed via the recirculation leg. In some aspects this recirculation leg may be as shown in FIG. 4B and may include for example a loop seal. In this implementation the calcium oxide material could behave as a circulating fluid bed while the calcium carbonate pellets behave as a back mixed bubbling fluid bed. There is a recirculating flow of steam, stream 705, which is used to fluidize the bed. Upon leaving the high temperature hydrator unit 740, the steam stream 701 goes through a dust collection system, which may include for example a baghouse unit 770 and/or cyclone unit 765 to remove any calcium oxide and calcium hydroxide particles from the steam stream before being sent to a high temperature fan 820 which then boosts the stream pressure for reintroduction into the fluidized bed.

In some implementations, in addition to any water carried into the high temperature hydrator unit 740 along with the pellet stream 700, some additional steam is necessary to convert 85% of the quicklime to hydrated lime via the hydrating reaction, $$CaO_{(s)} + H_2O_{(g)} \rightarrow Ca(OH)_{2(s)} + 105.2 \text{ kJ}$$

In some aspects of this implementation, the additional steam can be provided by pulling a low pressure steam stream 729 off of a turbine 780 (as shown in FIG. 7) and injecting this stream 729 into the fluidizing steam flow after it has passed through the high temperature baghouse unit 770. In some other aspects, the additional water needed to complete the above hydrating reaction could be directly injected into streams 704 or 705 as liquid water (not shown).

The choice between feeding water into the recirculating steam loop and using low pressure steam from the steam turbine 780 is determined by the economic trade-off between the additional energy generated by having the extra steam flow through the steam turbine 780, and the additional capital and operating costs of generating extra boiler feed water and processing the extra steam.

A number of embodiments of the invention have been described. Nevertheless, it will be understood that various modifications may be made without departing from the spirit and scope of the invention. Accordingly, other embodiments are within the scope of the following claims. Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims.

What is claimed is:

1. A method comprising:
transferring at least one feed stream comprising calcium oxide, calcium carbonate, water, and a fluidizing gas into a fluidized bed;
contacting the calcium oxide with the water;
based on contacting the calcium oxide with the water, initiating a hydrating reaction;
producing, from the hydrating reaction, calcium hydroxide and heat;
transferring a portion of the heat of the hydrating reaction to the calcium carbonate; and
fluidizing the calcium oxide, calcium hydroxide, and the calcium carbonate into a first fluidization regime and a second fluidization regime, the first fluidization regime comprising at least a portion of the calcium carbonate and at least a portion of the calcium oxide, the second fluidization regime comprising at least a portion of the calcium hydroxide and at least another portion of the calcium oxide, the first fluidization regime different than the second fluidization regime.

2. The method of claim 1, wherein the second fluidization regime comprises another portion of the calcium carbonate.

3. The method of claim 1, wherein fluidization takes place using at least one fluidization velocity, the at least one fluidization velocity sufficient to cause the at least a portion of one of the calcium carbonate, calcium hydroxide or calcium oxide to separate from the at least a portion of the other calcium carbonate, calcium hydroxide or calcium oxide into the first and second fluidization regime.

4. The method of claim 1, wherein the first and second fluidization regimes comprise a bubbling bed regime and at least one of a transport or turbulent regime.

5. The method of claim 4, further comprising:
fluidizing at least a portion of the calcium carbonate in the bubbling bed regime; and
fluidizing at least a portion of the calcium hydroxide in the transport or turbulent fluidization regime.

6. The method of claim 1, wherein the fluidizing gas comprises steam.

7. The method of claim 4, further comprising:
recirculating a portion of at least one of the calcium oxide or the calcium hydroxide in the transport or turbulent fluid regime back into the fluidized bed; and
based on the recirculating, increasing a residence time of at least one of the calcium oxide or calcium hydroxide in the fluidized bed.

8. The method of claim 1, further comprising:
generating steam from excess heat; and
circulating the generated steam to provide heat or power to the at least one of a downstream heat consumer or power producers.

9. The method of claim 1, further comprising providing the water from at least one of a steam feed, a liquid water feed, or water from a wet calcium carbonate feed.

10. The method of claim 1, further comprising recirculating the fluidization gas that exits a fluidized gas outlet of the fluidized bed to a fluidization gas inlet of the fluidized bed.

11. The method of claim 1, wherein the method is part of a caustic recovery process.

12. The method of claim 11, wherein the caustic recovery process is part of at least one of a direct air capture process, a carbon dioxide capture process, or a pulp and paper process.

13. The method of claim 1, wherein at least a portion of one of calcium carbonate, calcium oxide or calcium hydroxide are separated into at least two different fluidization regimes based on one or more of physical properties of the calcium carbonate, calcium oxide, or calcium hydroxide.

14. The method of claim 13, wherein the one or more physical properties comprises at least one of density, particle size or shape.

15. The method of claim 1, further comprising at least one of heating or drying the calcium carbonate with at least one of a sensible heat of the calcium oxide or the produced heat of the hydrating reaction.

16. The method of claim 1, wherein each of the calcium oxide, the calcium carbonate, the water, and the fluidizing gas are transferred into the fluidized bed in a separate feed stream.

17. The method of claim 1, wherein the calcium oxide and at least a portion of at least one of the water or the fluidizing gas are transferred into the fluidized bed in a first fluid stream, and the calcium carbonate and at least a portion of at least one of the water or the fluidizing gas are transferred into the fluidized bed in a second fluid stream that is separate from the first fluid stream.

* * * * *